Jan. 27, 1970

S. H. CAMERON 3,492,421

GRAPHICAL TRANSLATOR

Filed July 5, 1966

INVENTOR.
Scott H. Cameron

BY *Hill, Sherman, Meroni, Gross & Simpson* ATTORNEYS

Jan. 27, 1970  S. H. CAMERON  3,492,421
GRAPHICAL TRANSLATOR
Filed July 5, 1966  2 Sheets-Sheet 2
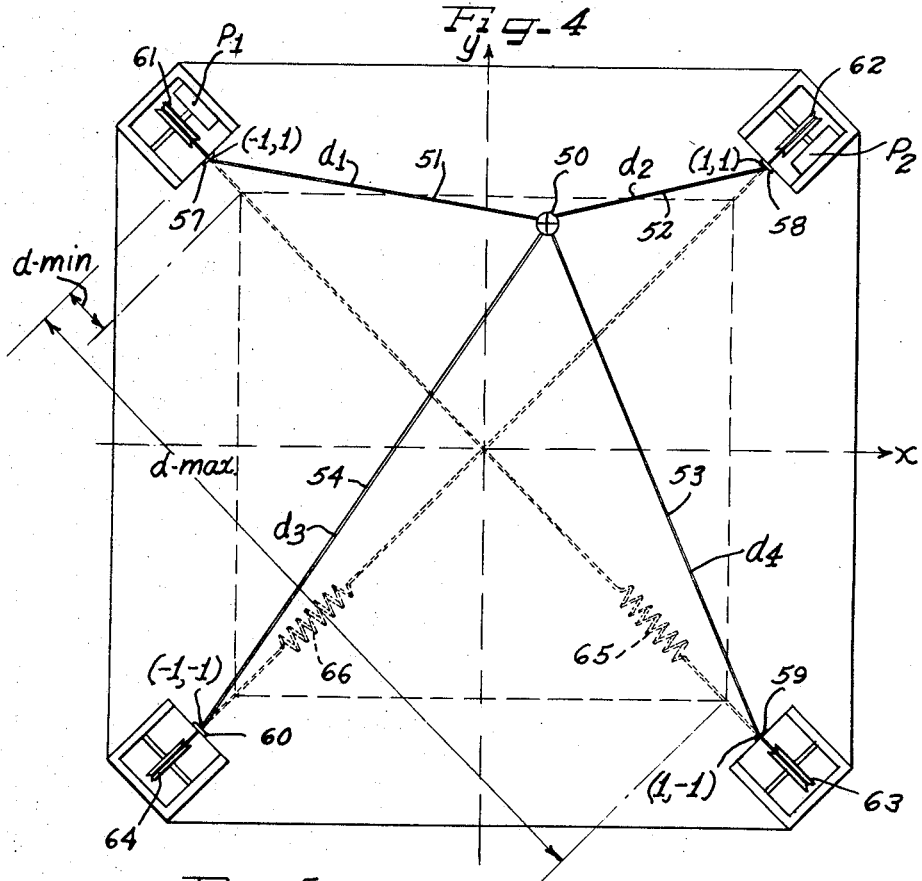
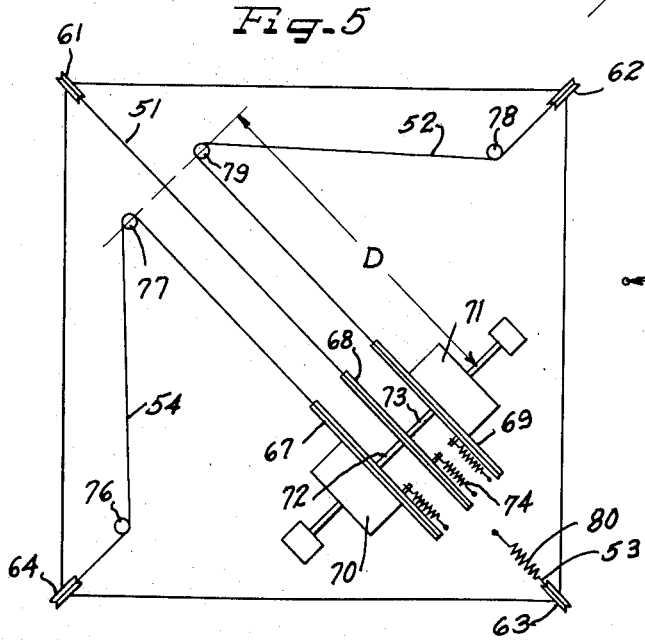
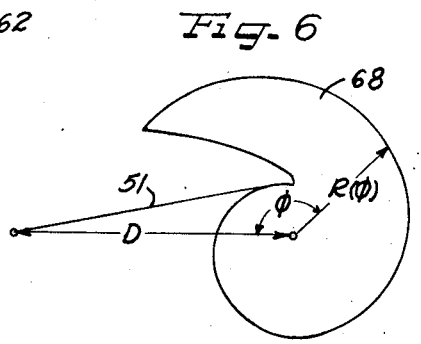
INVENTOR.
Scott H. Cameron
BY  ATTORNEYS

3,492,421
GRAPHICAL TRANSLATOR
Scott H. Cameron, Northfield, Ill., assignor to IIT Research Institute, Chicago, Ill., a corporation of Illinois
Filed July 5, 1966, Ser. No. 562,646
Int. Cl. G08b 5/22
U.S. Cl. 178—18                                     17 Claims

ABSTRACT OF THE DISCLOSURE

A graphical translator for registering the position of an indicator in a two dimensional space employing at least two flexible cables which are freely movable over the surface of the two dimensional space and which have potentiometers and encoders associated with the movement of each of the cables to generate an output signal which is indicative of the rectilinear coordinates of the indicator.

---

This invention relates to a graphical translator and more particularly relates to a novel means for electrically representing the instantaneous position of a pointer or indicator relative to a reference coordinate system.

Various systems have been developed for converting the graphical orientation of a pointer or indicator into electrical signals which are indicative of the instantaneous positioning of the pointer. The resulting signal may then be used to control the vertical and horizontal deflection of an electron beam such as in a cathode ray tube or may be used in conjunction with a pre-planned computer program as a graphical input data signal. By coupling such a graphical translator to a computer system, an on-line graphical analysis can be accomplished which renders instantaneous numerical computer data in response to the combination of pre-fed data input and the graphical location of a stylus. In this way, a variety of design problems can be solved directly by graphical experimentation without the necessity of having to translate graphical data into numerical data for programming a computer.

Various devices have been developed for converting graphical data into an electrical signal. For instance, a graphical translator such as the graphical input system described in my copending United States patent application Ser. No. 516,403 may be used for developing instantaneous electrical signals which reflect the rectilinear coordinates of the positioning of a pointer on a graphical surface. My copending application provides for the production of two voltages which are proportional to the normal Cartesian coordinates of a pointer. This is accomplished by producing multiplexed electric field patterns having predetermined configurations for identifying each point on a graphical surface by voltages which are proportional to the coordinates of such points.

Establishing a uniform electric field, however, across a graphical surface in both X and Y directions, for instance, requires the use of a substantial number of rectifier devices which adds to both the cost and the complexity of such a system.

Accordingly, it is a principal object of this invention to provide an improved graphical translation system which is both simple in design and economical in construction.

It is also an object of this invention to provide a graphical translator system which utilizes a non-electrical graphical surface and which converts the position of a pointer thereon into an instantaneous electrical signal.

It is a more specific object of this invention to provide a graphical translator system utilizing first and second potentiometers and associated cable means which are operably connected to a movable pointer for developing output voltages to reflect the instantaneous position of the pointer in a two-dimensional region.

It is another object of this invention to provide a graphical translator system having first and second potentiometers mounted on a graphical tablet and having associated continuous loop cable means disposed in substantialy perpendicular relationship to readily translate the positioning of a pointer into electrical signals which are proportional to the instantaneous rectilinear coordinates of the pointer.

These and other objects, features and advantages of the present invention will be understood in greater detail from the following description and the associated drawings wherein reference numerals are utilized in designating an illustrative embodiment and wherein:

FIGURE 4 is a top view similar to FIGURE 3 of another embodiment of this invention;

FIGURE 5 is a bottom view of a further embodiment of this invention showing a cam and encoder arrangement, and FIGURE 6 is a view of a cam as might be employed in the embodiment shown in FIGURE 5.

Figures 1, 2, 3:
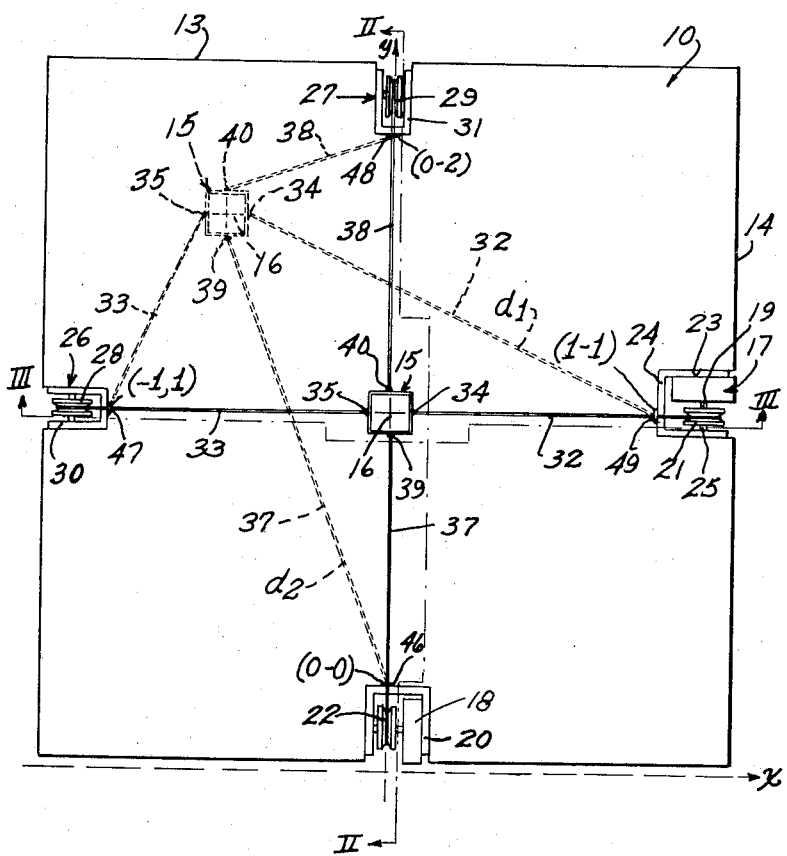
FIGURE 1 is an elevational view of a graphical translator according to this invention showing in full line the normal position of a pointer associated with the potentiometers of this invention and showing in dotted lines a position of the pointer which is spaced both horizontally and vertically from the normal position thereof.
FIGURE 2 is a sectional view taken along the lines II—II of the graphical translator device of FIGURE 1 showing the orientation of the vertical pulley system and showing the resilient means utilized to accommodate movements of the graphical pointer.
FIGURE 3 is a sectional view taken along the lines III—III of the graphical translator of FIGURE 1 showing the orientation of the horizontal pulley set and the resilient means connected thereto as well as the relationship of the horizontal and vertical cable means utilized in this invention.

In the illustrative embodiment, a tablet 10 is utilized as the support means and as the graphical orientation means of this invention. In particular, the tablet 10 has a graphical surface 11 and a back surface 12 about which the cable means of this invention is disposed to register the instantaneous position of a graphical pointer. The tablet 10 may be formed of any suitable rigid material and may be conductive or nonconductive. In this invention, the tablet 10 carries no electric signal, and no means are required to establish an electrical field on or about the graphical surface 11. Accordingly, the electrical properties of the tablet 10 are unimportant and rectifier means are not required to provide multiplexed electric field patterns.

The tablet 10 is formed of a substantially flat or plane material as is shown in FIGURES 2 and 3 and is shaped so as to have substantially rectilinear sides 13 and 14 as is indicated in FIGURE 1. Accordingly, the tablet 10 may be said to approximate the configuration of a cathode ray screen having X and Y coordinates which may be likened to the X and Y deflections of an electron beam associated with a cathode ray tube. It will be understood of course, that the tablet 10 may have a plurality of alternate configurations and may be so constructed as to reflect not only the two dimensions shown in FIGURE 1 but a third dimension as well.

In the illustrative embodiment of this invention, an eye-piece 15 is utilized as the pointer or stylus or indicator means which may be employed to locate a specified position on the graphical surface 11 of the tablet 10. For this purpose, the eye-piece 15 has a cross-hair 16 which may be used to precisely locate a selected point. The eye-piece 15 is substantially freely movable about the graphical surface 11, and according to this invention means are provided to electrically represent the graphical positioning of the eye-piece 15.

The means provided in this invention to develop an output electrical signal which is related in a determinable way to the graphical positioning of the eye-piece 15 comprice first and second potentiometers 17 and 18. The potentiometers 17 and 18 may take a variety of forms, for instance, the output of the potentiometers may be linearly related to the movement of an associated control means or may be related thereto in a square law manner. In FIGURE 1, the control means consists of knobs or shafts 19 and 20 which are operably associated with the potentiometers 17 and 18 to provide the desired change in voltage with respect to the rotation thereof.

Pulley means or pulleys 21 and 22 are fixedly mounted to the control means or shafts 19 and 20, and the entire assembly is suitably mounted to the tablet 10. In particular, a U-shaped groove or notch 23 is formed within the tablet 10, and a suitable bracket 24 supports the potentiometer and pulley combination at their respective locations. The pulley 21 is, of course, journalled within the bracket 24 as at 25 so as to be freely rotatable.

Third and fourth pulley means 26 and 27 are mounted within the tablet 10 opposite the potentiometers 17 and 18 respectively. The pulley means 26 and 27 comprise essentially pulleys 28 and 29 which are rotatably mounted within associated brackets 30 and 31. The brackets are, in turn, fixedly secured to the tablet 10.

The pulley means 26 and the potentiometer pulley combination 17–21 may be said to comprise a pulley set, while the pulley means 27 and the potentiometer pulley combination 18–22 may be said to comprise a second pulley set. The pulley sets operate in conjunction with a cable means for providing measured two-dimensional movement of the eye-piece 15 within the limits of the plane provided by the graphical surface 11.

The cable system of this invention may be said to comprise two distinct cable means. The first cable means is shown horizontally in the drawing and comprises a cable having first and second segments 32 and 33 which are connected to the eye-piece 15 at suitable connectors 34 and 35 and which extend in opposite directions from the eye-piece 15 around the pulleys 21 and 28 to the back surface 12 of the tablet 10. The cable segments 32 and 33 are then joined to a resilient means 34a at suitable connectors 35a and 36a.

The resilient means 34a may comprise a simple linear spring or an elastic band. In general, the resilient means 34a is connected to the cable segments 32 and 33 in such a manner as to assure that the segments 32 and 33 are maintained in a taut relationship about the pulleys 21 and 28. By providing that the horizontal cable means consisting of the segments 32 and 33 is maintained taut about the pulleys 21 and 28, sufficient friction is provided between the cable and pulley to assure that movement of the cable segments 32 and 33 will correspond to an equal circumferential movement of the respective pulleys. In particular, if the potentiometer 17 is to register movements of the eye-piece 15 it is necessary that the pulley 21 and the cable segment 32 maintain a non-slip rotatable relationship. In this way, movement of the cable 32 will be geared directly to the output signal of the potentiometer 17.

The presence of the resilient linkage 34 also allows movement of the eye-piece 15 outside of the plane of rotation of the pulley set 21–28. It is apparent, for instance, that as the eye-piece 15 deviates from a straight line connecting the pulleys 21 and 28, the continuous loop provided by the cables 32 and 33 must be effectively lengthened. The resilient means 34a satisfies this need and allows the continuous cable loop to be stretched away from its normal or substantially relaxed position intermediate the pulleys 21 and 28.

A second cable means which is orientated vertically in the drawing comprises first and second cable segments 37 and 38 which are connected to the eye-piece 15 by suitable connectors as at points 39 and 40. The cable segments 37 and 38 are joined to form a continuous loop at a second resilient means or linkage 41 as at the points 42 and 43. As in the case of the resilient means 34a, the resilient means 41 maintains a taut relationship about the vertical pulleys 22 and 29 and allows a deviation in the horizontal positioning of the eye-piece 15 from the normal or intermediate position.

In this way, the combination of the vertical deviation provided by the resilient means 34a and the horizontal deviation provided by the resilient means 41 allows the eye-piece 15 to move substantially freely about the entire surface of the graphical tablet 10. It may be noted that while the horizontal and vertical cable means are connected at a substantially common point, namely at the eye-piece 15, on the graphical surface 11, the cable means are not connected at the back surface 12 of the tablet 10. In contrast, ti is desirable, in this embodiment to maintain the respective cable means freely movable relative to one another at the back surface 12 of the tablet 10. To allow such free relative movement between the separate cable means, additional pulley means 44 and 45 are disposed at the back surface of the tablet 10 which maintain the vertical cable in spaced relation with the horizontal cable as shown in FIGURE 2.

It is apparent that as the eye-piece 15 is moved about the graphical surface 11 of the tablet 10, the respective cable means will cause rotation of the pulleys 21 and 22 for adjusting the potentiometers 17 and 18. Accordingly, movement of the eye-piece 15 about the graphical surface 11 will be associated with continuously changing voltages at the output of the potentiometers 17 and 18. These voltages may then be interpreted for the purpose of electrically relating the graphical position of the eye-piece 15 within the plane of the tablet 10.

For reference purposes, the X–Y axis system has been indicated in FIGURE 1 and guide clips 46, 47, 48 and 49 have been identified with rectilinear coordinate values. Using this reference system, it is noted that if the eye-piece 15 is moved along its horizontal normal position indicated by the line $Y=1$, the resilient means 34a will not be stretched, and the potentiometer 17 will directly reflect the X coordinate of the eye-piece. This means that the voltage generated by the potentiometer 17 will be proportional to the movement of the eye-piece 15 so long as that movement is confined to the line $Y=1$. However, as the eye-piece 15 is moved in a vertical direction, the resilient means 34a will be stretched, and the potentiometer 17 will be correspondingly actuated without a corresponding change in the X positioning of the eye-piece 15.

Likewise, as the eye-piece 15 is moved along the line $X=0$, the potentiometer 18 will directly reflect the positioning of the eye-piece. However, as the eye-piece 15 is deviated from the line $X=0$, the potentiometer 18 will be actuated in a manner which does not proportionally reflect the Y orientation of the eye-piece.

However, assuming the potentiometers 17 and 18 to produce an output voltage which is linearly related to the movement of the cables 32 and 37, respectively, equations can be written which readily define the precise graphical position of the eye-piece 15 in terms of the output voltages of the potentiometers 17 and 18. In particular, if the distance from the guide clip 49 to the eye-piece 15 is identified as $d_1$, and the distance from the clip guide 47 to the eye-piece 15 is identified as $d_2$, then the following equations apply:

$$d_2^2 = X^2 + Y^2$$
$$d_1^2 = (X-1)^2 + (Y-1)^2$$

Accordingly, since the potentiometer readings may be related to the distances $d_1$ and $d_2$, it is apparent that the normal Cartesian coordinates relating to the position of the eye-piece 15 may be expressed in terms of the output voltages of the potentiometers 17 and 18.

The direct readings of the potentiometers 17 and 18 may be fed into a computer system for solving the respective equations or suitable resistance matrix systems may be developed for directly yielding output voltages which are related to the normal Cartesian coordinates of the eye-piece 15.

Also, the potentiometers may be square law types so as to solve the equations for X and Y in an analog manner. For instance, if the output voltage of potentiometer 17 is described as $V_1 = Kd_1^2$, then $$d_1^2 = \frac{1}{K} V_1$$

It will be apparent that various orientations of the potentiometer means and the cable means can be provided to accomplish output voltage readings which will reflect the graphical position of the eye-piece 15. For instance, potentiometers may be positioned in three corners of the tablet 10, and equations written which will express the output voltages of those potentiometers in terms of the Cartesian coordinates of the eye-piece.

Another particularly desirable embodiment of my invention is shown in FIGURE 4. In FIGURE 4 the hand held stylus 50 is in fact a small Lucite knob to which four flexible non-extensible cables 51, 52, 53 and 54 have been attached. The device is used by grasping the knob 50 and moving it over the working surface 55 on which a map or drawing has been placed and pointing to locations of interest with the cross-hairs 56 which have been ruled on the bottom of the Lucite knob. The four cables 51 through 54 are led through four eyelets 57, 58, 59 and 60 respectively mounted at the corners of the working surface, thence around pulleys 61, 62, 63 and 64 placed as indicated in FIGURE 1 to the underside of the board, and finally joined in pairs to coil springs 65 and 66 as shown in dotted lines in FIGURE 4. The function of the springs 65 and 66 is to maintain the cables taut while permitting motion of the stylus 50 over the entire surface 55. A suitable angular transducer, e.g. shaft encoder or potentiometer, attached to the shaft on which a pulley is mounted, provides a measure of the distance from the stylus to the corresponding eyelet. In particular with respect to FIGURE 4, the potentiometer $P_1$ provides a measure of $d_1$ which is defined to be the distance from the eyelet at $(-1, 1)$ to the stylus. The distance $d_2$, is similarly defined with respect to a potentiometer $P_2$.

Note that in the indicated coordinates system, $$d_1^2 = (x+1)^2 + (y-1)^2 \quad (1)$$

and $$d_2^2 + (x-1)^2 + (y-1)^2 \quad (2)$$

From (1) and (2) we may readily obtain, $$x = (d_1^2 - d_2^2)/4 \quad (3)$$

and $$y = 1 + \sqrt{d_1^2 - (x+1)^2}, \quad (4)$$

which permit the recovery of $x$ and $y$ from the measurements $d_1$ and $d_2$. A digital computer with which the potentiometers are communicating may be employed to evaluate the relations (3) and (4).

It should be apparent that the square root operation of Equation 4 can be avoided by introducing a third potentiometer to provide a measure of $d_3$. That is, since $$d_3^2 = (x+1)^2 + (y+1)^2 \quad (5)$$

then $$y = (d_3^2 - d_1^2)/4 \quad (6)$$

Also with the third transducer available we might employ square law potentiometers so that $d_1^2$, $d_2^2$, and $d_3^2$ are available directly as voltages, in which case the evaluation of Equations 3 and 6 can be mechanized by straightforward analog techniques. Thus analog measures of $x$ and $y$ are available directly from this invention.

A further embodiment of the configuration of this invention is shown in FIGURES 5 and 6. This embodiment makes digital versions of the coordinates available directly.

In FIGURE 5, the cables representing the distances $d_1$, $d_2$, and $d_3$ are led over the respective corner pulleys and thence to identical spiral cams 67, 68 and 69 arranged as indicated, and on which the cables are wrapped. Devices 70 and 71 are digital shaft encoders having double shaft extensions 72 and 73 each of which has been connected to the cam 68. A watch motor type spring is employed to maintain the cable 51 taut and is illustrated diagrammatically in FIGURE 5 as a coil spring 74 connected to cam 68. The cam 68 is designed so that the rotation of the shafts 72 and 73 to which it is fixed is proportional to the square of the length of cable 51 which has been pulled through an eyelet 57 (FIG. 4). Because the cam 68 is connected to both shaft encoders 70 and 71 the shaft rotation of each encoder is caused to be proportional to the square of $d_1$ of FIGURE 4. The top view of the embodiment of FIGURE 5 may be similar to that of FIGURE 4 and accordingly reference is made to FIGURE 4 for illustrative purposes. The cables which measure $d_2$ and $d_3$ are routed as about guides 76, 77, 78 and 79 as indicated in FIGURE 5 and ultimately wrapped on the cams 67 and 69 which have been fixed to the cases of the shaft encoders 70 and 71. Thus the rotation of the shaft encoder cases are caused to be proportional respectively to $d_2^2$ and $d_3^2$. Since a linear shaft encoder output is proportional to the difference in the shaft and case rotation, the two encoders 70 and 71 provide measures of the $x$ and $y$ coordinates of the stylus directly in digital form. Another arrangement might be to connect the rotation of the two cams to a differential, to subtract the rotations therein, and to use the output directly as an indication of the position of the stylus.

The spring 80 shown fixed to the cable 53 is used simply to balance the forces acting on the stylus so that it is easy to manipulate.

The cam required to provide the proper relationship between its rotation and the length of cable pulled through a fixed eyelet must be determined in part from dimensional parameters associated with the geometry of this invention. While the relationship desired is of the form $\theta = kd_1^2$, where $\theta$ is the rotation of the cam shaft, $d_1$ is one of the distances indicated in FIGURE 3, and $k$ a constant of proportionality, it is clear that this relationship cannot be maintained for very small $d$. This is the case because of the fact that as $d$ goes to zero, so does $d\theta/d1$ which means that $d1/d\theta$ is becoming increasingly large and the radius of the cam must increase with it. Since the maximum radius of the cam is bounded by mechanical considerations I conclude that the working region must not extend all the way to the eyelet. If we let $d_{\min}$ be the distance from an eyelet to the closest corner of the working surface, and $d_{\max}$ be the distance to the most remote corner of the working surface, we may establish K as follows:

$$\theta_{\max} = Kd^2_{\max}$$
$$\theta_{\min} = Kd^2_{\min}$$
$$\theta_{\max} - \theta_{\min} = K(d^2_{\max} - d^2_{\min})$$

and since the shaft encoder must rotate through one revolution while $d$ changes from $d_{\max}$ to $d_{\min}$ we obtain $$K = 2\pi/(d^2_{\max} - d^2_{\min})$$

Another parameter of importance is the distance from the center of rotation of the cam to the eyelet through which the cable passed just prior to wrapping on the cam. This distance is indicated as D in FIGURE 5.

As indicated in FIGURE 6, the cam is denoted by $R(\phi)$ in polar coordinates. $R'(\phi)$ denotes the derivative of $R$ with respect to the angle $(\phi)$. With these interpretations of K, D, $\phi$, R, and R' the required cam is found from the solution of the following differential equation:

$$\phi = \tan^{-1}(R^2/D \sqrt{R^2 + R'^2 - R^4/D^2}) + \tan^{-1}(R'/R) - (R^2 + R'^2)/4KR^4$$

Patent No. 2,685,054 shows an encoder which may be used to develop output signals in a cable arrangement according to applicant's invention. Also, beginning on page 6–40 of Notes on Analog-Digital Conversion Techniques, Susskind, Wiley and Technology Press, 1957 explains the general function of such devices. In addition, reference to the differential means for performing subtraction between two shafts may be found on page 39 of Electronic Instruments, Radiation Laboratory Series, vol. 21, McGraw-Hill Book Company, Inc., 1948.

I claim as my invention:

1. A graphical translator comprising:
    first and second spatially separated potentiometer means,
    each of said potentiometer means having a control means operably associated therewith for varying the signal output of said potentiometer means,
    cable means extensibly associated with each of said control means for actuating said potentiometer means in response to an extensible movement of said cable means,
    indicator means,
    first and second of said cable means extending from said indicator means and being mechanically coupled to said first and second potentiometer control means,
    said first and second cable means being connected to said indicator means substantially perpendicular to each other at a point spaced from at least one of said first and second potentiometer means,
    a third cable means extending from said indicator to a point generally oppositely of the direction of said first and second cable means to balance translational forces acting on said first and second cable means, and
    said cable means being freely movable in a two dimension space and operating at least one of said first and second potentiometer means in response to movement thereof.

2. A graphical translator in accordance with claim 1 wherein said first and second cable means together with said indicator means comprises first and second continuous control cables respectively, said first and second continuous control cables being orientated relative to each other in a rectilinear manner for generating an output signal from each of said potentiometers to reflect the spatial position of said indicator means relative to specified reference coordinates.

3. A graphical translator in accordance with claim 1 wherein interpreter means are associated with the combined signals of each of said potentiometers for generating a resulting output signal which reflects the position of said indicator means in terms of a specified graphical coordinate system.

4. A graphical translator in accordance with claim 1 wherein said cable means are movable across said control means to operate said potentiometer means and wherein a resilient linkage is operatively connected to said cable means to accommodate extension and retraction of said cable means relative to said potentiometer means.

5. A graphical translator in accordance with claim 1 wherein a third cable is attached to said indicator means and is retractable to a point spaced from said first and second potentiometer means.

6. A graphical translator comprising:
    a table having a graphical surface and a back surface,
    first and second continuous cable loops surrounding the tablet in a rectilinear relationship,
    said first and second cable loops being rotatably mounted on said tablet and being joined at the graphical surface of the tablet,
    first and second potentiometer means geared to the rotational movement of said first and second cable loops respectively, and generating an output signal in proportion to the extensible movement of said associated cable loop therefrom,
    indicator means affixed to the junction of said cable loops at said graphical surface for moving said first and second cable loops freely about said graphical surface, and
    output means for registering the signals from said potentiometers.

7. A graphical translator in accordance with claim 6 wherein a first set of pulley means is provided at opposing spaced points on said tablet for rotatably supporting said first cable loop such that said first cable loop extends over said first pulley set and across said graphical surface,
    a second set of pulley means is provided at opposing spaced points on said tablet for rotatably supporting said second cable loop such that said second cable loop extends over said second pulley set and across said graphical surface,
    said first and second pulley sets being orientated on said table such that said first and second cable loops are tracked in a substantially perpendicular relationship on said graphical surface, and wherein said first and second potentiometer means are geared to the rotation of said first and second sets of pulley means, respectively.

8. A graphical translator in accordance with claim 7 wherein said cable loops extend around said respective pulley sets and across both the graphical surface and the back surface of the tablet and wherein a resilient linkage is formed within each of said cable loops adjacent the back surface of said tablet to accommodate extension of said cable loops in a direction perpendicular to the plane of rotation of said associated pulley set.

9. A graphical translator in accordance with claim 8 wherein said resilient linkage has a relatively short length in comparison to the length of the associated cable loop, and wherein said resilient means is connected to the associated cable means in an extended manner for maintaining said cable means in a taut relationship about the associated pulley set and for establishing an operable friction contact with said pulley set.

10. A graphical translator in accordance with claim 8 wherein said indicator means is freely movable in two-dimensional space about the graphical surface of said tablet and wherein interpreter means are associated with said potentiometer means for registering the two-dimensional position of said indicator means in a specified graphical coordinate system.

11. A graphical translator in accordance with claim 10 wherein said interpreter means comprises means for translating the output of said potentiometer into an electrical signal which is proportioned to the instantaneous rectilinear coordinates of said indicator means.

12. A graphical translator comprising:
    a working surface,
    first, second and third reference points spatially established relative to each other and fixedly established relative to the working surface,
    first and second cable means extensibly associated respectively with said first and second reference points,
    means associated with each of said first and second cable means for registering the degree of extension of the cable means relative to the associated reference point and for developing an information signal indicative of the extension of the cable means relative to the reference point,
    said first cable means associated with said first reference point being jointly movable with said second cable means associated with said second reference point, third cable means being jointly movable with said first and second cable means and being coupled to said third reference point to help balance translational forces acting on said first and second cable means, and indicator means connected to one of said cable means and being freely movable in a two-dimension space on said working surface.

13. A graphical translator in accordance with claim 12 wherein said means associated with each of said cable means for registering the degree of extension of the cable means and for developing an information signal indicative of that extension comprises a shaft encoder having a cam mounted on the encoder shaft and having a cable means wrapped around the cam for operating the encoder in response to extension of the cable relative to the reference point.

14. A graphical translator in accordance with claim 13 wherein said cam has an operating profile which is contoured such that the angle of rotation of the profile is substantially proportional to the square of the length of the cable which is extended relative to the associated reference point.

15. A graphical translator comprising:

a working surface, first, second and third reference points spatially established relative to each other and fixedly established relative to the working surface, first, second and third cable means extensibly associated respectively with said first, second and third reference points, a shaft encoder having first and second encoder casings rotatably mounted relative to the working surface and a common encoder shaft rotatably mounted relative to the casings, first and second cams fixedly mounted respectively to said first and second casings, each of said first and second cams receiving one of the cable means thereabout, a third cam fixedly mounted to the common shaft and receiving the third cable means thereabout, an indicator means, and said first, second and third cable means being joined to the indicator means and being jointly freely movable in two-dimension space adjacent the working surface.

16. A graphical translator comprising:

a working surface, first and second reference points spatially established relative to each other and fixedly established relative to the working surface, first and second cable means extensibly associated respectively with said first and second reference points, first and second cams mounted for rotation relative to the working surface, said first and second cable means wound respectively about said first and second cams, each of said cams having an operating profile which is contoured to a given non-linear relationship of cable extension to cam rotation, means for generating an output signal in response to the rotation of said cams, an indicator means, said first and second cable means being joined to the indicator means and being jointly freely movable in two-dimension space adjacent the working surface.

17. A graphical translator in accordance with claim 10 wherein said means associated with each of said cable means for developing an information signal comprises first and second cams having said first and second cable means wrapped around the cams respectively and a differential means for subtracting the rotation of one cam from the rotation of the other cam, and a shaft encoder means responsive to the output of the differential means.

References Cited

UNITED STATES PATENTS

| | | | |
|---|---|---|---|
| 386,815 | 7/1888 | Gray | 178—19 |
| 2,322,653 | 6/1943 | Mitchell | 178—19 |
| 3,355,730 | 11/1967 | Neasham | 178—18 |

THOMAS A. ROBINSON, Primary Examiner

U.S. Cl. X.R.

33—1